United States Patent
Veerappagowda et al.

(10) Patent No.: US 9,438,511 B2
(45) Date of Patent: Sep. 6, 2016

(54) IDENTIFYING A LABEL-SWITCHED PATH (LSP) ASSOCIATED WITH A MULTI PROTOCOL LABEL SWITCHING (MPLS) SERVICE AND DIAGNOSING A LSP RELATED FAULT

(71) Applicant: HEWLETT PACKARD ENTERPRISE DEVELOPMENT LP, Houston, TX (US)

(72) Inventors: Ullas Vasthare Veerappagowda, Bangalore (IN); Akash Deep, Bangalore (IN); Kotilingareddy Bhavanam, Bangalore (IN); Muthukumar Suriyanarayanan, Bangalore (IN); Kashinath Nallapeta Satyanarayana Setty, Bangalore (IN); Chetna Bhagat, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 604 days.

(21) Appl. No.: 13/762,203

(22) Filed: Feb. 7, 2013

(65) Prior Publication Data

US 2014/0160918 A1    Jun. 12, 2014

(30) Foreign Application Priority Data

Dec. 11, 2012    (IN) .......................... 5166/CHE/2012

(51) Int. Cl.
*H04L 12/24*    (2006.01)
*H04L 12/723*    (2013.01)

(52) U.S. Cl.
CPC ............. *H04L 45/507* (2013.01); *H04L 45/50* (2013.01)

(58) Field of Classification Search
CPC .......... H04L 41/0668; H04L 41/0654; H04L 45/507; H04L 45/50; H04L 45/28; H04L 45/22
USPC ........ 370/218, 400, 244, 228, 392, 225, 254
See application file for complete search history.

(56) References Cited

U.S. PATENT DOCUMENTS

| | | | |
|---|---|---|---|
| 7,463,591 B1 | 12/2008 | Kompella et al. | |
| 7,486,622 B2 | 2/2009 | Regan et al. | |
| 7,602,702 B1* | 10/2009 | Aggarwal | H04L 45/00 370/217 |
| 7,948,986 B1* | 5/2011 | Ghosh | H04L 45/50 370/392 |
| 7,966,420 B2 | 6/2011 | Mehta et al. | |
| 7,983,174 B1 | 7/2011 | Monaghan et al. | |
| 2005/0276217 A1* | 12/2005 | Gadgil | H04L 45/28 370/225 |

OTHER PUBLICATIONS

Acharya, Arup, et al., Multi-Protocol Label Switching (MPLS), IBM Research, 2001.

* cited by examiner

*Primary Examiner* — Jamal Javaid
(74) *Attorney, Agent, or Firm* — Hewlett Packard Enterprise Patent Department

(57) ABSTRACT

Provided is a method of identifying a Label-switched Path (LSP) associated with a Multi Protocol Label Switching (MPLS) service in a network. An MPLS service is identified in a network and logical neighbors of the MPLS service are determined. For each logical neighbor of the MPLS service, an LSP label is identified. Based on the LSP label, a unique out segment of the LSP associated with the Multi Protocol Label Switching (MPLS) service is identified.

17 Claims, 9 Drawing Sheets

IDENTIFYING A LABEL-SWITCHED PATH (LSP) ASSOCIATED WITH A MULTI PROTOCOL LABEL SWITCHING (MPLS) SERVICE AND DIAGNOSING A LSP RELATED FAULT

CLAIM FOR PRIORITY

The present application claims priority under 35 U.S.C 119 (a)-(d) to Indian Patent application number 5166/CHE/2012, filed on Dec. 11, 2012, which is incorporated by reference herein in its entirety.

BACKGROUND

Multi Protocol Label Switching (MPLS) is a standard technology that provides a scalable and protocol agnostic mechanism for movement of data in a computer network. The usefulness of MPLS originates from the fact that it can work with many other networking technologies such as Internet Protocol (IP), Frame-Relay and Asynchronous Transfer Mode (ATM). MPLS uses layer 3 routing protocols along with layer 2 transport mechanisms. In an MPLS network, data packets are encapsulated with labels and packet-forwarding decisions are made based on these labels without the need to look at the contents of the data packets.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

Figure 1:
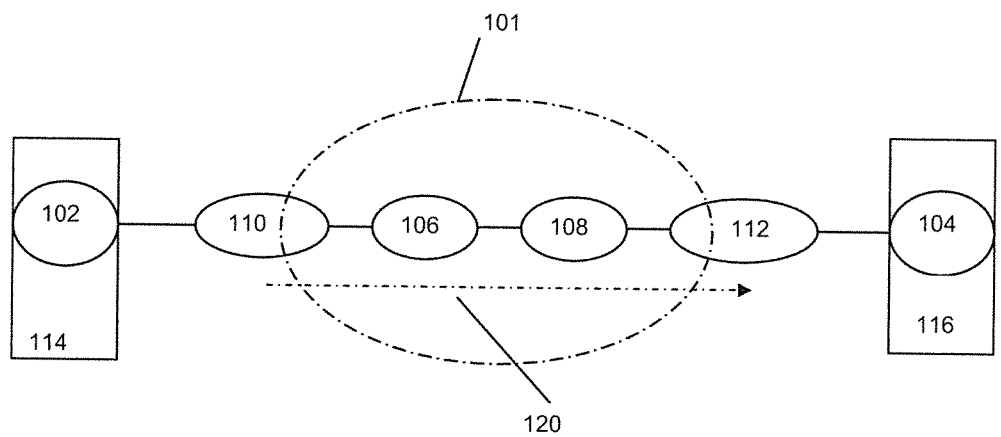
FIG. 1 shows a block diagram of a network system, according to an example.

As mentioned earlier, Multi Protocol Label Switching (MPLS) is a protocol agnostic technology that can be used to encapsulate packets of a variety of network protocols. In a service provider scenario, customers of the service provider connect to the backbone of the MPLS network through Provider Edge (PE) routers. The backbone is made up of core routers that provide connectivity between the PE routers. A Customer Edge (CE) router at a customer site connects to the MPLS network at one or more Provider Edge (PE) routers. IP routing protocols are used to exchange routing information and calculate forwarding paths between routers. Examples of IP routing protocols include Open Shortest Path First (OSPF) and Border Gateway Protocol (BGP). MPLS signaling protocols are used to establish and maintain Label-switched Paths. Examples of MPLS signaling protocols include Resource Reservation Protocol (RSVP) and Label Distribution Protocol (LDP).

MPLS provides a mechanism to encapsulate a group of related data packets with a "label". Also, instead of forwarding data packets on a hop-by-hop basis, paths are established in a MPLS network for particular source-destination pairs. The predetermined paths that make MPLS work are called Label-switched Paths (LSPs). All related data packets than take the same deterministic path. The label switched paths (LSPs) define the flow of packets between two endpoints. Because a preset path exists, individual routing nodes don't need to do a forwarding lookup on the packets as they enter the router. Routers in an MPLS network exchange MPLS information to set up these paths for various source-destination pairs. A path is set up based on criteria in the Forwarding Equivalence Class (FEC).

A Label-switched Path (LSP) begins at a label edge router (LER), which makes a decision on which label to prefix to a packet. It then forwards the packet along to the next router in the path, which swaps the packet's LSP label for another label, and forwards it to the next router. The last router in the path removes the label from the packet and forwards the packet based on the header of its next layer. The router which first adds the MPLS header to a packet is called an ingress router. The last router in an LSP, which removes the label from the packet, is called an egress router. Routers in between, which may only swap labels, are called label switch routers (LSRs).

In a typical MPLS network, a host of services like Layer 3 VPN (Virtual Private Network), Layer 2 VPN, Metro-Ethernet, Internet Protocol television (IPTV), etc. can be deployed. Since each service may establish its own LSP, it is difficult to identify a LSP taken by a service without logging into the device.

Proposed is a solution that identifies a LSP associated with a service on a MPLS network. Proposed solution helps in visualizing an end to end LSP for a MPLS service on a network.

In addition since a LSP's state has a direct impact on services being offered, it is important to monitor LSPs in the core network and determine any impact on performance of a LSP. Given that a LSP going down could bring down a service being offered, any change in a LSP should be notified to operators for a corrective action. It is equally challenging to identify the root cause of the fault.

Proposed solution therefore also helps in diagnosing LSP related faults along with root cause and exact fault position which can help a network administrator to quickly rectify the problem and have reduced down time for a service. Proposed solution also generates incidents for an operator, to notify impact on MPLS services with point of failure.

FIG. 1 shows a block diagram of a network system 100, according to an example. In an implementation, network system 100 is based on Multi Protocol Label Switching (MPLS) mechanism. Network system 100 comprises a service provider (SP) network (101) connected to customer sites (114, 116). The service provider (SP) network (101) comprises of core routers (106, 108) and Provider Edge (PE) routers (110 and 112). Customer sites (114, 116) are connected to the Provider Edge (PE) routers (110 and 112) through Customer Edge (CE) routers (102 and 104) respectively. Core routers (106 and 108) are connected to Provider Edge (PE) routers (110 and 112) respectively.

A service provider (SP) network (101) may be any organization or an enterprise that offers VPN or other IP routing services. Customer sites (114, 116) may be other networks, such as, but not limited to, VPNs, extranets and intranets.

In an example implementation, service provider network (101) may offer Layer 3 VPN services to customer sites (114 and 116). In such case, to route data packets from customer site 114 to customer site 116, a Label-switched Path (LSP) 120 may be established in service provider network 101 between Provider Edge router (110) and Provider Edge router (112). The Label-switched Path (LSP) is established from Provider Edge router (110) to Provider Edge router (112) through core routers (106 and 108). Since a data packet(s) enters the service provider network 101 through Provider Edge router (110), the Provider Edge router (110) may act as ingress Label Edge Router (LER). An ingress Label Edge Router (LER) encapsulates a data packet with a "label" and also selects an initial path for the labeled data packet. Provider Edge router (112) acts as egress Label Edge Router (LER). An egress Label Edge Router (LER) is the final router at the end of Label-switched Path 120 and performs decapsulation of a data packet (removes the label). Core routers (106 and 108) act as Label Switching Routers (LSRs) that perform label switching tasks. In the present example, the LSP begins from Provider Edge router 110 and advances to Provider Edge router 112 via core routers 106 and 108. Said differently, the LSP progresses as follows: Provider Edge router 110->core router 106->core router 108->Provider Edge router 112. Although a unidirectional LSP is shown in the FIG. 1, the proposed method is not limited to one. A bi-directional traffic may be established between customer sites 114 and 116. In such case, a pair of unidirectional paths (in opposite direction) may be set up for exchange of data packets. Service provider network 101 may implement an appropriate MPLS protocol, such as but not limited to, a Label Distribution Protocol (LDP) or Resource Reservation Protocol (RSVP) to set up a Label-switched Path (LSP) in the network. More information regarding MPLS can be obtained from RFC 3031 by Internet Engineering Task Force (IETF), titled "Multiprotocol Label Switching Architecture" and dated January 2001, which is incorporated herein by reference.

Figure 2:
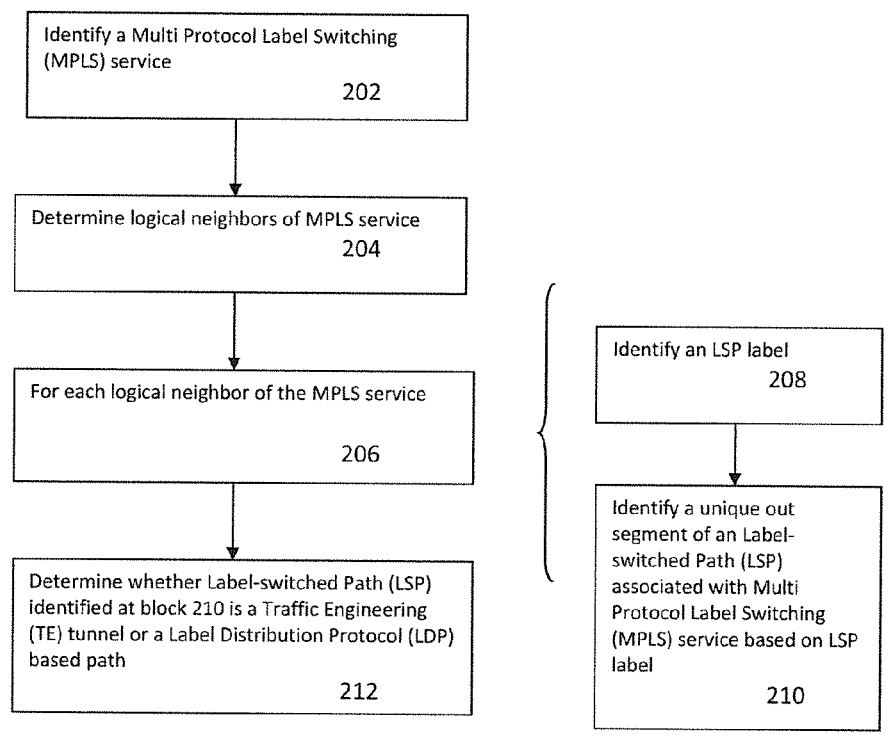
FIG. 2 shows a flow chart of a method of identifying a Label-switched Path (LSP) associated with a Multi Protocol Label Switching (MPLS) service in a Multi Protocol Label Switching (MPLS) based network, according to an example.

FIG. 2 shows a flow chart of a method of identifying a Label-switched Path (LSP) associated with a Multi Protocol Label Switching (MPLS) service in a Multi Protocol Label Switching (MPLS) based network, according to an example. The method may be implemented in the form of a computer program (machine readable instructions) executable by a processor. In an implementation, the method may be implemented on a computer system coupled to a network system. A computer system implementing the method may be in an online mode or offline mode with respect to a network system.

At block 202, a service(s) hosted on a network device (for example, a router) of a network system is/are identified. In an example, the network device is a Provider Edge (PE) device. In an implementation, the network system is based on Multi Protocol Label Switching (MPLS) mechanism. Some non-limiting examples of services which may be hosted on a Provider Edge (PE) device include Layer 3 VPN (Virtual Private Network), Layer 2 VPN, Internet Protocol television (IPTV), VPN Routing and Forwarding (VRF) and Layer L2 pseudo wire (PW).

At block 204, for a service identified at block 202, all logical neighbors of the service are determined. For example, if an identified service is VRF then all VRF neighbors are identified for the aforesaid VRF. In another example, if the identified service is Pseudowire than all Pseudowire neighbors are determined.

At block 206, for each logical neighbor of a service (identified at block 202) on remote Provider Edge (PE) device, a service mapping is obtained. In an implementation, the mapping of a service occurs at a Provider Edge (PE) device. Command Line Interface (CLI) commands are used to obtain relevant parameters like, "LSP Label", "Destination" (remote PE) etc. In an example, if the service is VRF, "VPN label" is also obtained as a parameter. In another example, if the service is PW, "VC label" is obtained as a parameter. The aforesaid parameters are populated in the form of a forwarding table, which would be different for each service. For example, there might be a VRF specific forwarding table on the Provider Edge (PE) device for a VRF service and a PW forwarding table for a PW service. These parameters are obtained and stored before doing a lookup across the network system.

Figure 3:
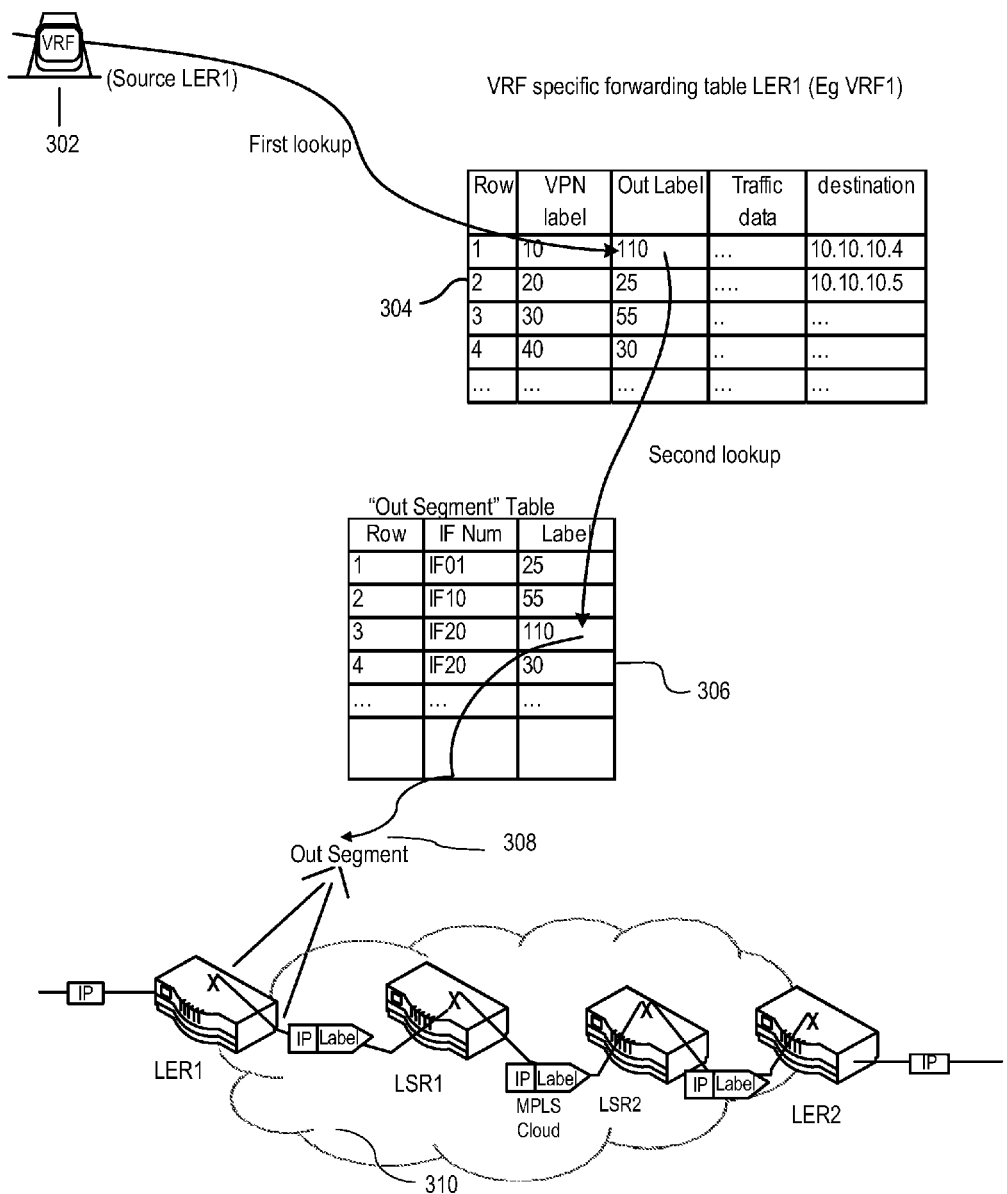
FIG. 3 illustrates mapping of a MPLS service to a Label-switched Path, according to an example.

In an implementation, a service mapping to a LSP is carried out by performing a first look up into the service tables and their appropriate forwarding tables to select essential parameters like next hop, LSP label, VPN label, etc 208. Block 208 along with block 210 (described below) describe a subroutine of block 206. A second lookup is then made into the "Out Segment" table of the same device using the LSP label as a key 210. The LSP label assists the device in locating a unique LSP to transit the packet to its destination. Once this unique "Out Segment" is determined on the network device where a service is hosted, the LSP can be traversed till the destination of the LSP. The destination and VPN label assist the traversal of LSP through the core network. An example illustration of a service mapping to a LSP for a VRF service is depicted in FIG. 3. Referring to FIG. 3, a VRF service is hosted on a Label Edge Router 1 (302). To map the VRF service to a LSP, a first look up is carried out into VRF specific forwarding table LER1 (Eg. VRF1) 304. The lookup identifies an LSP label 110. Based on the aforesaid LSP label (acting as a key), a second look up is performed into an "Out Segment" table 306 to identify a unique LSP 308 to transit a service packet to its destination in network system 310.

Service mappings may include the label stack, remote peer address, Traffic engineering tunnel details, etc. The label stack can be of multiple levels, where it always has an inner service label and optional LDP and TE label. The obtained service mappings are stored against the corresponding service.

At block 212, a determination is made whether the Label-switched Path identified at block 210 to reach remote Provider Edge (PE) router is a TE tunnel or a Label Distribution Protocol (LDP) based path. If the identified Label-switched Path is a TE tunnel, TE details are stored. However, if the Label-switched Path is a Label Distribution Protocol (LDP) based path, LSP label is stored. In an example, if the service identified at block 202 is VRF then at this stage VPN label is also stored along with TE details or LSP Label, as applicable. In another example, if the service hosted on the network system is Pseudowire then VC label is also stored along with TE details or LSP Label, as applicable.

Figure 4:
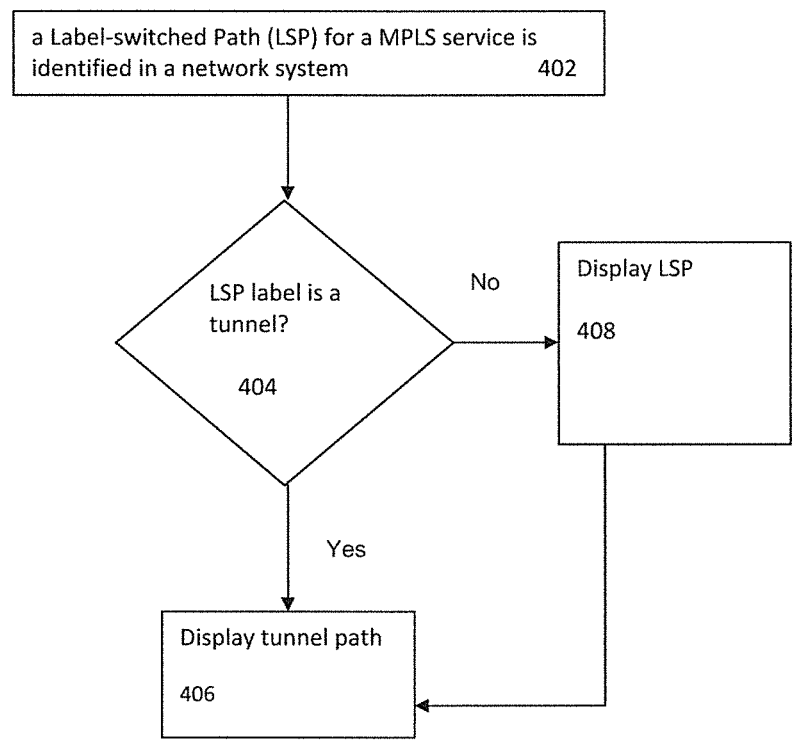
FIG. 4 shows a flow chart of a method of displaying a Label-switched Path (LSP) associated with a Multi Protocol Label Switching (MPLS) service in a Multi Protocol Label Switching (MPLS) based network, according to an example.
Figure 5:
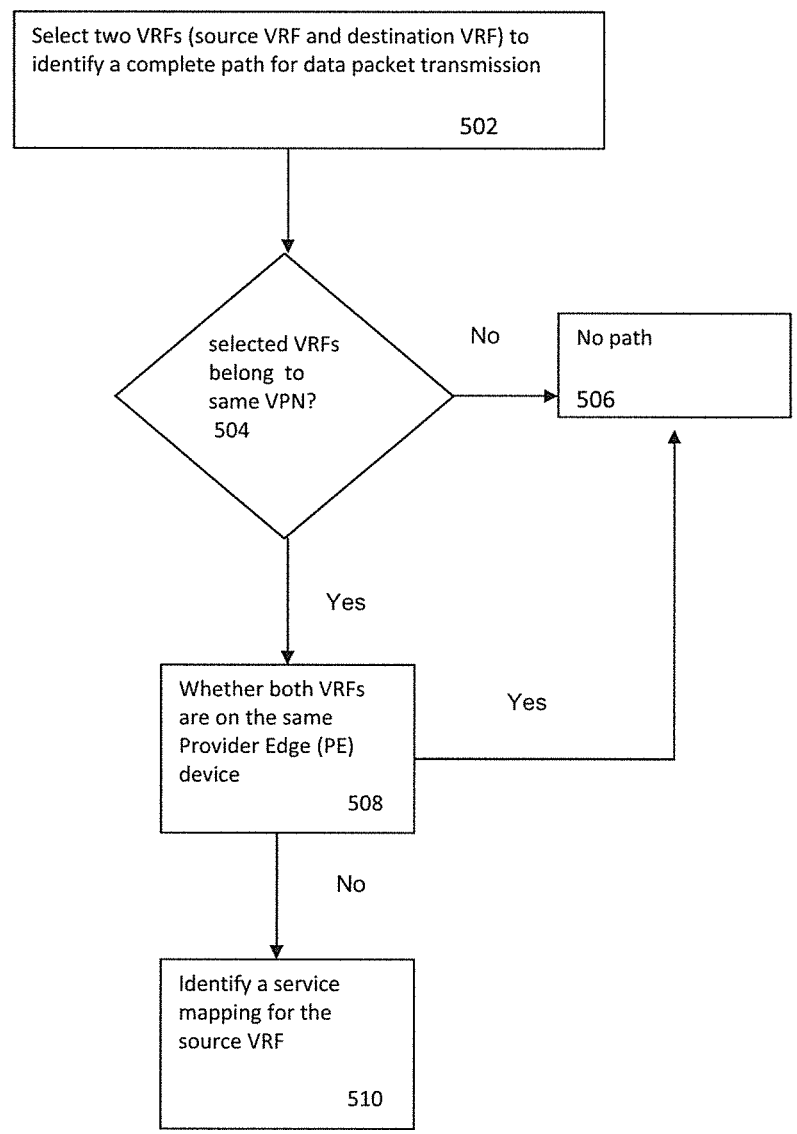
FIG. 5 shows a flow chart of a method precursor to the method of FIG. 4, according to an example.

FIG. 4 shows a flow chart of a method of displaying a Label-switched Path (LSP) associated with a Multi Protocol Label Switching (MPLS) service in a Multi Protocol Label Switching (MPLS) based network, according to an example. Once a service has been associated with a LSP in a network system, for example through a method described earlier in reference to FIG. 3, the LSP path can be displayed on a display device. Referring to FIG. 4, at block 402, an LSP for a MPLS service is identified in a network system. Once such service mapping is available, a determination is made whether the "LSP label" for the service is a tunnel 404. If it is determined that the "LSP label" for the service is a tunnel, tunnel path is displayed on a display device 406. On the other hand, if the "LSP label" for the service is not a tunnel, LDP path is shown on a display device 408. To provide an example, let's consider that a L3 VPN service is hosted on a MPLS-based network. This is illustrated in FIG. 5 which shows a flow chart of a method precursor to the method of FIG. 4 for a L3 VPN path display prior to availability of service mapping details for the VPN. In such instance, two VRFs (source VRF and destination VRF) are selected for identifying a complete path for data packet transmission 502. If the selected VRFs are identified as belonging to same VPN, a validation of VRF-to-VRF neighbour relation is carried out 504. Else, a path is said to be unavailable 506. At block 508, a determination is made to find out whether both VRFs are on the same Provider Edge (PE) device. If yes, a service mapping is identified for the source VRF 510 (for example through a method described earlier in reference to FIG. 3). Once a service mapping is available, a LSP path for the L3VPN service can be displayed on a display device through a method described earlier in reference to FIG. 4.

Figure 6:
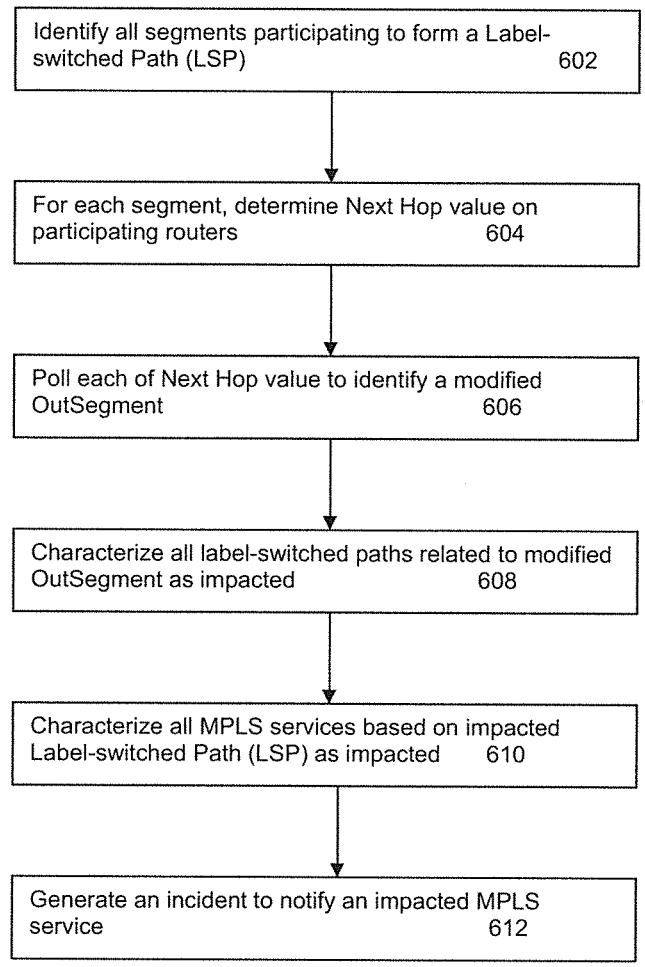
FIG. 6 shows a flow chart of a method of determining an impacted Multi Protocol Label Switching (MPLS) based service, according to an example.

FIG. 6 shows a flow chart of a method of determining a variation in a Label-switched Path (LSP) associated with a Multi Protocol Label Switching (MPLS) service, according to an example. Referring to FIG. 6, at block 602, all segments participating to form a LSP are determined. In an example, this information is obtained through discovery data. Now, for each segment, the Next Hop value on participating routers is determined and a list of such Next hop values is created. At block 604, all said Next Hop value for each segment is loaded into a poller for periodic polling. At block 606, each of the OutSegment is polled to check if it has changed. If an OutSegment Next Hop value has not changed, no action may be taken except that said OutSegment may be polled again during the next polling cycle. If an OutSegment Next Hop value has changed, a LSP(s) which is/are impacted is/are identified (block 608). Now, for each of the aforesaid LSP, a MPLS service(s) which is/are impacted is/are determined (block 610) by using the data stored during the service mapping algorithm. In an implementation, said determination is made based on service mapping carried out as part of LSP discovery (for example through a method described earlier in reference to FIG. 3). In addition, based on polled fault point, the actual root cause of the problem may be determined along with a point of failure. This is explained below with reference to FIG. 7. At block 612, incidents for a network operator or administrator may be generated to notify impact on MPLS Services with point of failure.

Figure 7:
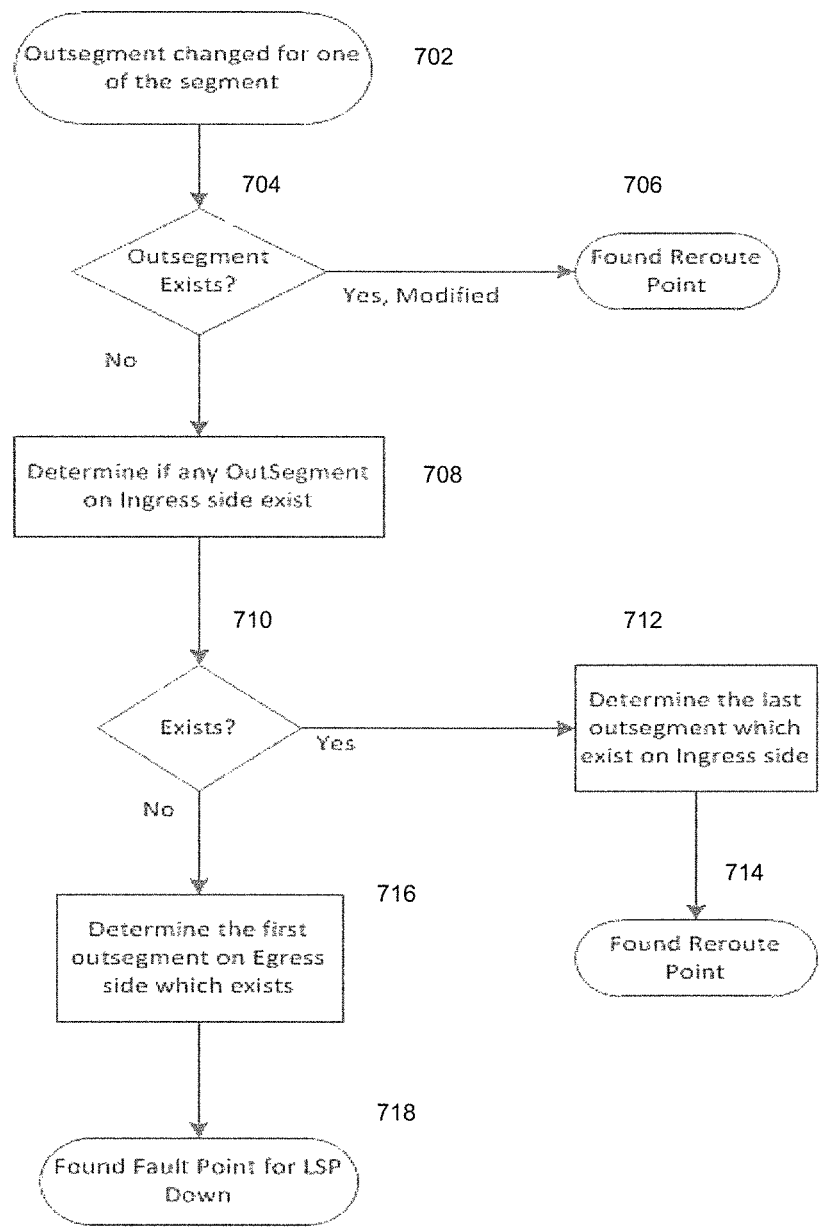
FIG. 7 shows a flow chart of a method of determining a point of failure in a Label-switched Path (LSP) associated with a Multi Protocol Label Switching (MPLS), according to an example.
Figure 8:
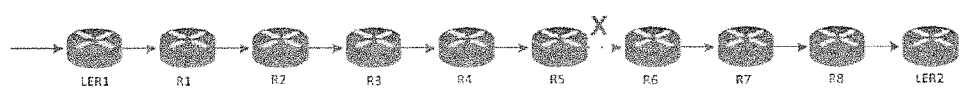
FIG. 8 illustrates a Label-switched Path reflecting a "down" scenario between a source and a destination device, according to an example.
Figure 9:
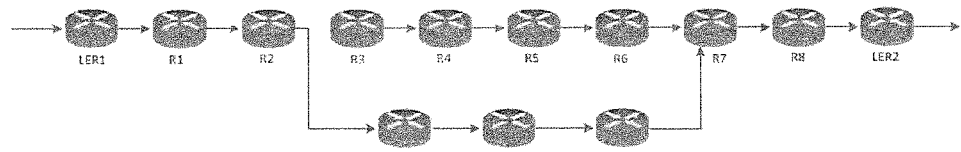
FIG. 9 illustrates a Label-switched Path reflecting a "reroute" scenario between a source and a destination device, according to an example.

FIG. 7 shows a flow chart of a method of determining a point of failure in a Label-switched Path (LSP) associated with a Multi Protocol Label Switching (MPLS) service, according to an example. Referring to FIG. 7, at block 702, a change in the OutSegment next Hop value identified during a polling (identified for instance through a method described earlier in reference to FIG. 6) is analyzed. If said OutSegment is found to exist but has been modified 704, it is identified as a case of a LSP being rerouted as OutSegment start pointing to a newer next hop for the same LSP 706. In addition, a determination may be made to find out if there is a physical connectivity issue in the path (Egress side) or if a better route has been found. In either case, it is identified as a root cause for a reroute. In case said OutSegment does not exist, there may be two possible scenarios. (a) LSP is down and hence an OutSegment has disappeared. This is illustrated in FIG. 8. In this case, a LSP is down because of connectivity issues between routers R5 & R6 as shown in the illustration. So, if an OutSegment at router R4 is missing it might be due to "Down" scenario. (b) A LSP has been rerouted on some other router in the path and hence an OutSegment has disappeared. This is illustrated in FIG. 9. In this case, a LSP is rerouted at router R2 and hence an OutSegment at router R2 is changed to point to another router. However, there may be a possibility in this case that the OutSegment at R4 might be missing. In such case, in order to determine the correct cause for OutSegment missing at router R4, a reverse traverse to the path is made to find out if any of the OutSegment still exists 708. There could be two possibilities in this scenario. (a) An existing OutSegment is found 710. In such case, it is a reroute scenario. In FIG. 9, an OutSegment may be found to be present at router R2 with a modified OutSegment. A determination is made to find if there is a physical connectivity issue in path or a better route has been identified. In this scenario, the aforesaid is identified as a root cause for a reroute with router R2 as a reroute point 714. (b) If it is determined that there is no OutSegment present on Ingress side then it is a scenario where a LSP may be down 716. In such case, the LSP path is traversed in the direction of the LSP till a segment is found where an OutSegment is present. The segment prior to the aforesaid segment is identified as a fault area which made the LSP to go down 718.

In another scenario, with reference to FIGS. 7 and 8, if router R4 is the first segment polled with an OutSegment missing then during traversal it may be found that an OutSegment at router R6 is still available. It could be because of a fault which might have occurred in connectivity [physical or logical] between routers R5 and R6 making the LSP to go down till router R6. The cause of fault could be determined from the network topology and status, and the fault could be marked as a root cause for the LSP down at router R5-R6 segment. It may be noted that during a reroute Root Cause Analysis, if a reroute happens due to some connectivity issues far from reroute, then those are determined by the right most missing OutSegment or the last missing OutSegment on the Egress side.

Figure 10:
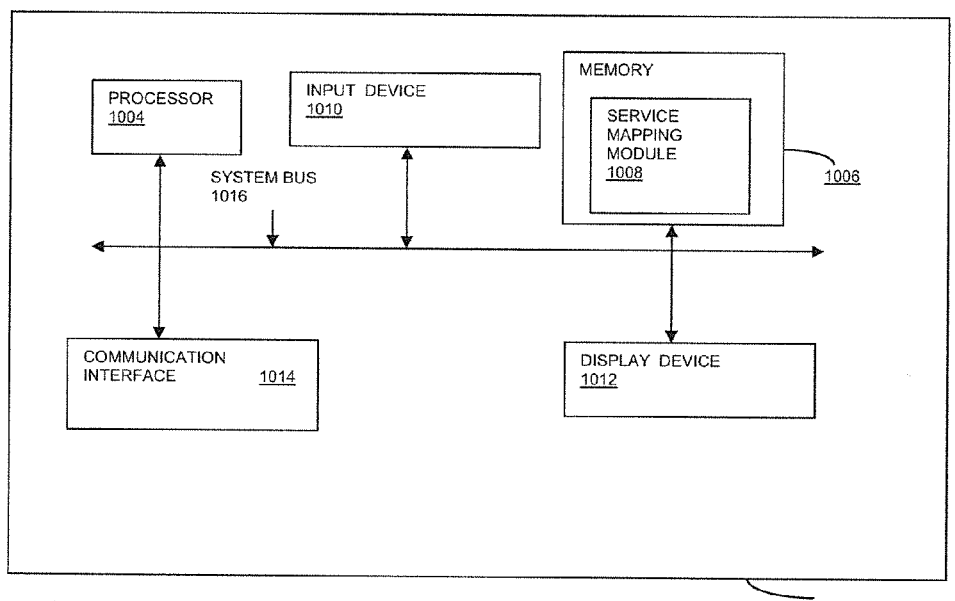
FIG. 10 shows a block diagram of a computer system upon which an embodiment may be implemented.

FIG. 10 shows a block diagram of a service mapping module hosted at a computer system 1002, according to an example.

Computer system 1002 may be a network device (for instance, a router), computer server, desktop computer, notebook computer, tablet computer, mobile phone, personal digital assistant (PDA), or the like.

Computer system 1002 may include processor 1004, memory 1006, image analysis module 1008, input device 1010, display device 1012, and a communication interface 1014. The components of the computing system 1002 may be coupled together through a system bus 1016.

Processor 1004 may include any type of processor, microprocessor, or processing logic that interprets and executes instructions.

Memory 1006 may include a random access memory (RAM) or another type of dynamic storage device that may store information and instructions non-transitorily for execution by processor 1004. For example, memory 1006 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 1006 may include instructions that when executed by processor 1004 to implement service mapping module 1008.

Service mapping module 1008, in an implementation, identifies an MPLS service in a network, determines logical neighbors of the MPLS service identifies an LSP label for each logical neighbor of the MPLS service, and identifies a unique out segment of an LSP associated with the Multi Protocol Label Switching (MPLS) service based on the LSP label.

Service mapping module 1008 may be implemented in the form of a computer program product including computer-executable instructions, such as program code, which may be run on any suitable computing environment in conjunction with a suitable operating system, such as Microsoft Windows, Linux or UNIX operating system. In an implementation, service module 1008 may be read into memory 1006 from another computer-readable medium, such as data storage device, or from another device via communication interface 1016.

Input device 1010 may include a keyboard, a mouse, a touch-screen, or other input device. Display device 1012 may include a liquid crystal display (LCD), a light-emitting diode (LED) display, a plasma display panel, a television, a computer monitor, and the like.

Communication interface 1014 may include any transceiver-like mechanism that enables computing device 1002 to communicate with other devices and/or systems via a communication link. Communication interface 1014 may be a software program, a hard ware, a firmware, or any combination thereof. Communication interface 1014 may provide communication through the use of either or both physical and wireless communication links. To provide a few non-limiting examples, communication interface 1014 may be an Ethernet card, a modem, an integrated services digital network ("ISDN") card, etc.

It would be appreciated that the system components depicted in FIG. 10 are for the purpose of illustration only and the actual components may vary depending on the computing system and architecture deployed for implementation of the present solution. The various components described above may be hosted on a single computing system or multiple computer systems, including servers, connected together through suitable means.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of identifying a Label-switched Path (LSP) associated with a Multi Protocol Label Switching (MPLS) service in a network, comprising:

by a processor:
    identifying the MPLS service;
    determining logical neighbors of the MPLS service;
    for each logical neighbor of the MPLS service, identifying an LSP label
    identifying a unique out segment of the LSP associated with the Multi Protocol Label Switching (MPLS) service based on the LSP label;
    determining whether the LSP is a Traffic Engineering (TE) tunnel or determining whether the LSP is a Label Distribution Protocol (LDP) based path; and
    storing the TE tunnel related information if the LSP is the TE tunnel or storing the LSP label related information if the LSP is the LDP based path; and
    displaying the TE tunnel or displaying the LDP based path.

2. The method of claim 1, further comprising determining an entire Label-switched Path (LSP) associated with the Multi Protocol Label Switching (MPLS) service upon identification of the unique out segment.

3. The method of claim 1, further comprising:
    determining whether the LSP is the Traffic Engineering (TE) tunnel; and
    storing the TE tunnel related information if the LSP is the Traffic Engineering (TE) tunnel.

4. The method of claim 3, further comprising displaying the TE tunnel.

5. The method of claim 2, further comprising:
    determining whether the LSP is the Label Distribution Protocol (LDP) based path; and
    storing the LSP label related information if the LSP is the Label Distribution Protocol (LDP) based path.

6. The method of claim 5, further comprising displaying the LDP based path.

7. A method of diagnosing a Label-switched Path (LSP) related fault in a Multi Protocol Label Switching (MPLS) based network, comprising:
    identifying all segments participating to form a Label-switched Path;

for each segment, determining an OutSegment Next Hop value on participating routers of the network;

polling each of said OutSegment Next Hop value to identify a modified OutSegment;

characterizing all Label-switched Paths related to the modified OutSegment as impacted;

characterizing Multi Protocol Label Switching (MPLS) services based on the impacted Label-switched Path as impacted; and generating an incident to notify an impacted Multi Protocol Label Switching (MPLS) service.

8. The method of claim 7, further comprising:

determining, for the modified OutSegment that exists, if there is a physical connectivity problem in a related label-switched patch; and if present, characterizing the physical connectivity problem as a root cause for a reroute.

9. The method of claim 7, further comprising characterizing a physical connectivity problem as a root cause for a Label-switched Path (LSP) down if an OutSegment does not exist.

10. A system to identify a Label-switched Path (LSP) associated with a Multi Protocol Label Switching (MPLS) service in a network, comprising:

a processor;

a service mapping module, implemented by the processor to:

identify the MPLS service;

determine logical neighbors of the MPLS service;

for each logical neighbor of the MPLS service, identify an LSP label;

identify a unique out segment of the LSP associated with the Multi Protocol Label Switching (MPLS) service based on the LSP label;

determine whether the LSP is a Traffic Engineering (TE) tunnel or determine whether the LSP is a Label Distribution Protocol (LDP) based path; and store the TE tunnel related information if the LSP is the TE tunnel or store the LSP label related information if the LSP is the LDP based path; and a display device to display the Label-switched Path (LSP) associated with a Multi Protocol Label Switching (MPLS) service in a network.

11. The system of claim 10, wherein the service mapping module determines an entire Label-switched Path (LSP) associated with the Multi Protocol Label Switching (MPLS) service upon identification of the unique out segment.

12. The system of claim 10, wherein the MPLS service is one of a Layer 3 Virtual Private Network (VPN), Layer 2 VPN, Traffic Engineering (TE) tunnel and Internet Protocol television (IPTV).

13. The system of claim 10, wherein the MPLS service is hosted on a network device.

14. The system of claim 13, wherein the network device is a Provider Edge (PE) router.

15. The system of claim 10, wherein the LSP is the Traffic Engineering (TE) tunnel.

16. The system of claim 10, wherein the LSP is the Label Distribution Protocol (LDP) based path.

17. A non-transitory processor readable medium, the non-transitory processor readable medium comprising machine executable instructions, the machine executable instructions when executed by a processor causes the processor to:

identify a Multi Protocol Label Switching (MPLS) service in a network; determine logical neighbors of the MPLS service;

for each logical neighbor of the MPLS service, identify an LSP label;

identify a unique out segment of Label-switched Path (LSP) associated with the Multi Protocol Label Switching (MPLS) service based on the LSP label;

determine an entire LSP for the MPLS service upon identification of the unique out segment;

identify all segments in the LSP for the MPLS service;

for each segment, determine an OutSegment Next Hop value on participating routers of the network;

poll each of the OutSegment Next Hop values to identify a modified OutSegment;

characterize all LSPs related to the modified OutSegment as impacted;

characterize MPLS services based on the impacted Label-switched Path as impacted; and generate an incident to notify an impacted Multi Protocol Label Switching (MPLS) service.

* * * * *